United States Patent
Bykampadi et al.

(10) Patent No.: US 10,826,946 B2
(45) Date of Patent: Nov. 3, 2020

(54) SECURITY MANAGEMENT IN COMMUNICATION SYSTEMS WITH PROVISIONING BASED MECHANISM TO IDENTIFY INFORMATION ELEMENTS

(71) Applicant: Nokia Technologies Oy, Espoo (FI)

(72) Inventors: Nagendra S. Bykampadi, Bangalore (IN); Suresh P. Nair, Whippany, NJ (US); Anja Jerichow, Munich (DE)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 16/014,358

(22) Filed: Jun. 21, 2018

(65) Prior Publication Data
US 2019/0253461 A1  Aug. 15, 2019

(30) Foreign Application Priority Data
Feb. 15, 2018  (IN) .............................. 201841005884

(51) Int. Cl.
*H04L 29/06* (2006.01)
*H04L 29/08* (2006.01)

(52) U.S. Cl.
CPC ........ *H04L 63/205* (2013.01); *H04L 63/0209* (2013.01); *H04L 63/105* (2013.01); *H04L 69/22* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2007/0280241 | A1* | 12/2007 | Verma | H04L 45/04 370/392 |
| 2010/0111307 | A1* | 5/2010 | Hu | H04L 63/0823 380/277 |
| 2010/0185862 | A1* | 7/2010 | Moore | H04L 9/08 713/171 |

(Continued)

FOREIGN PATENT DOCUMENTS

| | | |
|---|---|---|
| EP | 3267709 | 1/2018 |
| WO | PCT/FI2019/050106 | 2/2019 |

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.

(Continued)

*Primary Examiner* — William J. Goodchild
(74) *Attorney, Agent, or Firm* — Ryan, Mason & Lewis, LLP

(57) ABSTRACT

In a communication system comprising a first network operatively coupled to a second network, wherein the first network comprises a first security edge protection proxy element operatively coupled to a second security edge protection proxy element of the second network, a method comprises provisioning at least a given one of the first and second security edge protection proxy elements with configuration information that enables the given security edge protection proxy element to identify at least one security operation to be applied to at least one information element in a received message before sending the message to the other one of the first and second security edge protection proxy elements.

22 Claims, 5 Drawing Sheets

(56) References Cited

U.S. PATENT DOCUMENTS

2013/0151684 A1    6/2013    Forsman et al.
2016/0087933 A1    3/2016    Johnson et al.
2018/0004377 A1    1/2018    Kitchen et al.

OTHER PUBLICATIONS

3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.

D. Hardt, ED., "The OAuth 2.0 Authorization Framework," Internet Engineering Task Force (IETF) Request for Comments: 6749, https://tools.ietf.org/html/rfc6749, Oct. 2012, 77 pages.

M. Jones et al., "JSON Web Token (JWT)," Internet Engineering Task Force (IETF) Request for Comments: 7519, https://tools.ietf.org/html/rfc7519, May 2015, 31 pages.

M. Jones et al., "JSON Web Signature (JWS)," Internet Engineering Task Force (IETF) Request for Comments: 7515, https://tools.ietf.org/html/rfc7515, May 2015, 60 pages.

M. Jones et al., "JSON Web Encryption (JWE)," Internet Engineering Task Force (IETF) Request for Comments: 7516, https://tools.ietf.org/html/rfc7516, May 2015, 52 pages.

M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.

Tim, "Analysis of Different Approaches for Implementing SBA Security Over N32 Reference Point," 3rd Generation Partnership Project (3GPP) TSG SA WG3 (Security), Meeting #90, Gothenburg, Sweden, Jan. 22-26, 2018, 5 pages.

Nokia, "Considerations on Applying Security on HTTP Message Payload," 3rd Generation Partnership Project (3GPP) TSG SA WG3 (Security), Meeting #90, Gothenburg, Sweden, Jan. 22-26, 2018, 5 pages.

3GPP TS 23.501 V15.0.0 (Dec. 2017), "3rd Generation Partnership Project; Technical Specification Group Services and System Aspects; System Architecture for the 5G System; Stage 2 (Release 15)," 3GPP Organizational Partners, 2017, 181 pages.

\* cited by examiner

US 10,826,946 B2

SECURITY MANAGEMENT IN COMMUNICATION SYSTEMS WITH PROVISIONING BASED MECHANISM TO IDENTIFY INFORMATION ELEMENTS

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises the following step. In a communication system comprising a first network operatively coupled to a second network, wherein the first network comprises a first security edge protection proxy element operatively coupled to a second security edge protection proxy element of the second network, the method comprises provisioning at least a given one of the first and second security edge protection proxy elements with configuration information that enables the given security edge protection proxy element to identify at least one security operation to be applied to at least one information element in a received message before sending the message to the other one of the first and second security edge protection proxy elements.

In one or more further embodiments, the configuration information with which the given security edge protection proxy element is provisioned comprises at least one of a header template and a payload template that enable the given security edge protection proxy element to identify at least one of a header and a payload in the received message such that an appropriate security operation is applied. In additional embodiments, the method further comprises provisioning at least a given one of the first and second security edge protection proxy elements with configuration information that enables the given security edge protection proxy element to identify at least one reverse security operation to be applied to at least one information element in a secured message received from the other one of the first and second security edge protection proxy elements.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
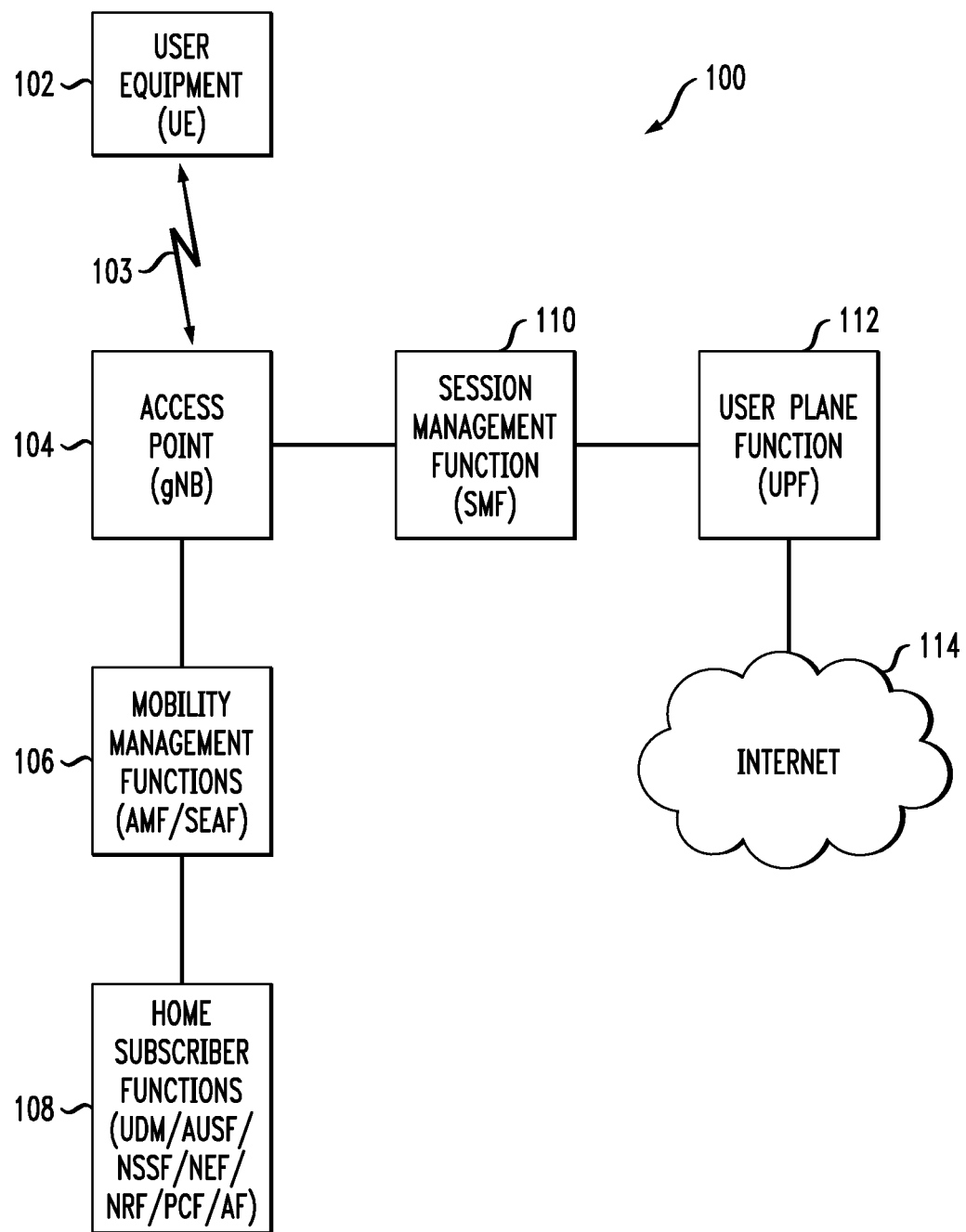
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
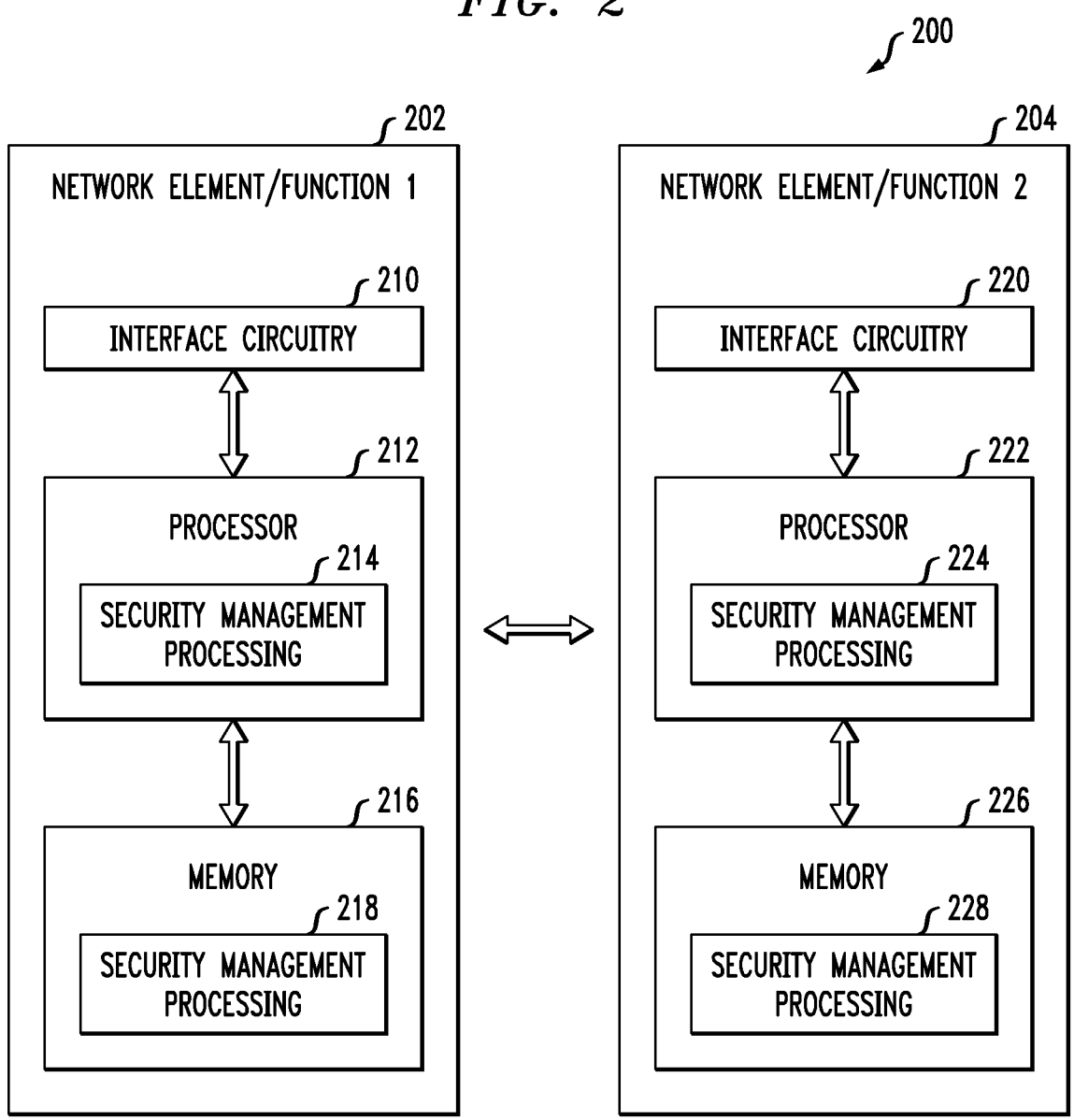
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. Further, one or both of the first network element/function 202 and the second network element/function 204 may be a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
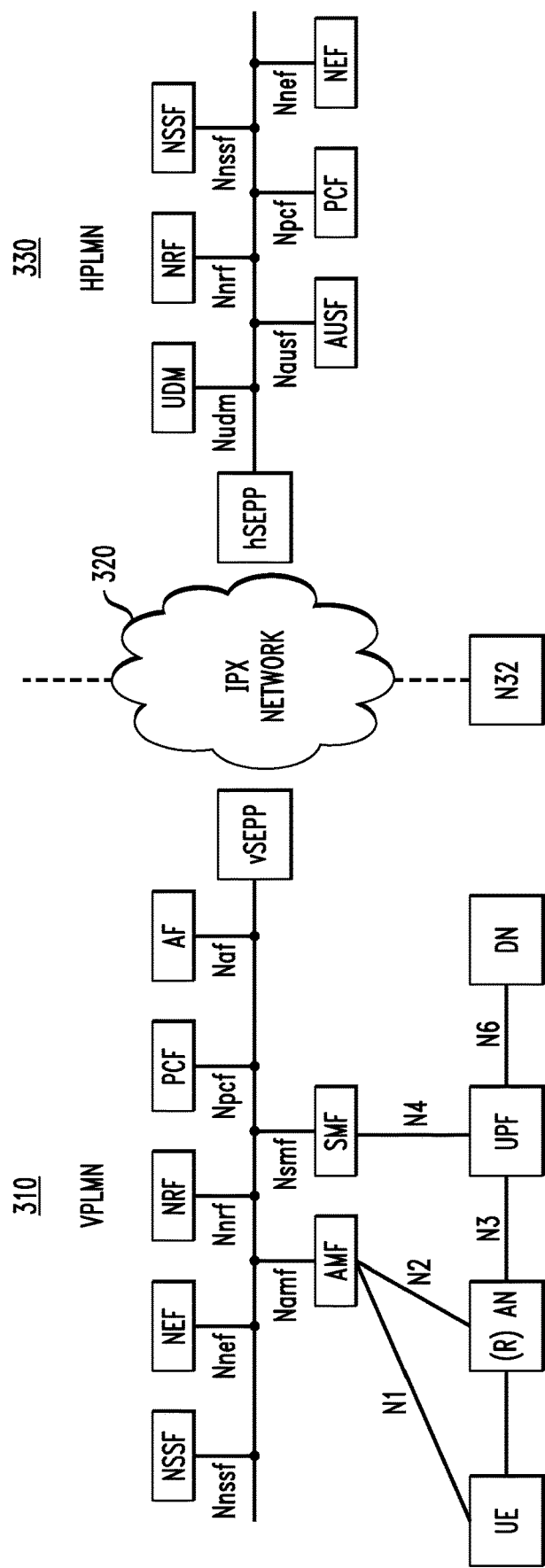
FIG. 3 illustrates a communication system architecture with security edge protection proxies between a visiting network and a home network with which one or more illustrative embodiments may be implemented.

FIG. 3 depicts a 5G architecture in a configuration comprising a visiting public land mobile network (VPLMN) 310 operatively coupled via an intermediate Internetwork Packet Exchange (IPX) network 320 to a home public land mobile network (HPLMN) 330. More particularly, FIG. 3 illustrates the presence of a Security Edge Protection Proxy (SEPP) at the edge of each PLM network (e.g., vSEPP in VPLMN 310 and hSEPP in HPLMN 330). It is to be appreciated that the various network functions shown in the VPLMN 310 and the HPLMN 330 are known and described in detail in various 5G specifications such as, but not limited to, the above-referenced TS 23.501 and TS 33.501.

Thus, the SEPP is the entity that resides at the perimeter of the network and performs Application Layer Security (ALS) on information elements (IE) in HyperText Transport Protocol (HTTP) messages before the messages are sent externally over a roaming interface (e.g., N32). ALS is performed individually on each IE in the HTTP Request message using a standardized JavaScript Object Signing and Encryption (JOSE) framework.

However, each IE may require different security protection, for example, only some of the IEs in the message need encryption, some will need integrity-protection while being allowed to be modified by a node in IPX network 320. Therefore, it is realized herein that since IEs may require different security protection, it is important for the SEPP to know how to treat each IE in the message received from the network function.

Identification of the IE and the required security mechanism to be applied on the IE is therefore a prerequisite step for the SEPP before it can apply security at the application layer.

As mentioned above, in 5G, SBA is introduced to model services as network functions (NFs) that communicate with each other using Restful APIs. In the scenario where the two communicating NFs are in two different PLMNs (e.g., VPLMN 310 and HPLMN 330), communication happens over the roaming interface between the two participating PLMNs.

To protect NF specific content in the messages that are sent over the roaming interface, 5G introduces SEPP as the entity residing at the perimeter of the PLMN network and acting as a gateway that protects all the traffic going out of the network. The SEPP implements application layer traffic for all the data exchanged between two NFs at the service layer.

The application layer traffic comprises all the IEs in the HTTP message payload and sensitive information in the HTTP message header. Not all the IEs get the same security treatment in SEPP. Some IEs require e2e encryption, some only require e2e integrity protection, while some IEs require e2e integrity protection but allow an intermediate IPX provider to manipulate these IEs.

The SEPP therefore needs a mechanism to identify IEs and the security mechanisms that need to be applied on them.

Illustrative embodiments address the above and other needs and challenges by provisioning the SEPP with information to provide the SEPP with the ability to determine the one or more appropriate security operations for each Information Element (IE) in the received message. More particularly, a mobile network operator (MNO) configures the SEPP with information about all the IEs expected in the HTTP Request message including the security mechanism that needs to be applied by the SEPP.

The SEPP is configured with information on all supported IEs in each release and how they are to be secured as they are sent out on the roaming interface (e.g., N32). In one or more illustrative embodiments, such configuration provisioning can be performed via the Operation, Administration, and Maintenance (OAM) interface of each SEPP. This can be a one-time action that is performed when SEPP is deployed in the network. However, the provisioned information can be updated in real-time at SEPP if needed. SEPP uses this information to identify each IE in the received HTTP message from a Network Function (NF) and then performs the necessary security action on the IE.

It is to be understood that the NF, in illustrative embodiments, is completely unaware of security operations with regard to the IEs it is passing to SEPP. Rather, the security operations are fully under the responsibility of SEPP.

Advantageously, SEPP applies application layer security on an outgoing message based on the provisioned information. In the reverse direction, SEPP restores the original message from the information available in the JOSE object.

Applying Security on an Outgoing Message:

Within the PLMN, SEPP interfaces with the NFs and terminates messages at the HTTP layer. On the outbound interfaces, SEPP interfaces with the other SEPPs over the N32 interface.

When SEPP (e.g., either vSEPP or hSEPP depending on the direction flow of the message) receives a message from the NF, it does the following:

a) SEPP parses the HTTP message payload beginning from the first IE.

b) For each IE in the message, SEPP refers to the provisioned configuration data and executes the required protection mechanism using the standardized JOSE framework. The transformed IE replaces the original IE.

c) Once SEPP parses the message completely, it transmits the secured message over the N32 interface.

Restoring Original Message from the Incoming Message:

When SEPP (e.g., either vSEPP or hSEPP depending on the direction flow of the message) receives an incoming message on the N32 interface:

a) SEPP parses the HTTP message payload beginning from the first IE.

b) For each IE in the message, SEPP transforms the secured message into the original message from the information contained in the JOSE object.

c) Once SEPP parses the message completely, it forwards the message to the destination NF.

Figure 4:
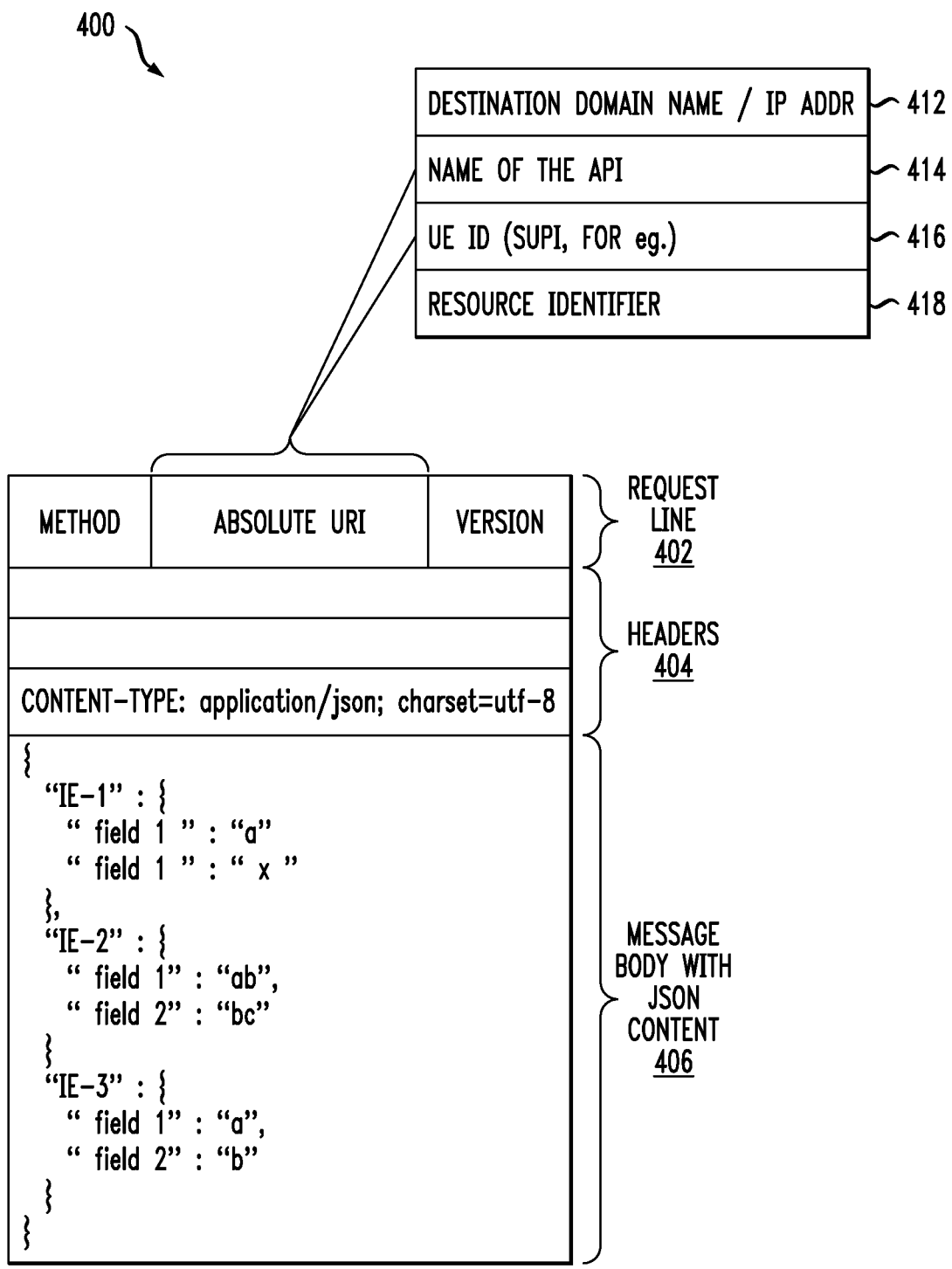
FIG. 4 illustrates an example of a message structure to enable a provisioned security edge protection proxy to parse the message and apply one or more appropriate security operations, according to an illustrative embodiment.

FIG. 4 illustrates an example of a message structure to enable a provisioned security edge protection proxy to parse the message and apply one or more appropriate security operations, according to an illustrative embodiment. More particularly, FIG. 4 illustrates a general application programming interface (API) structure for a message from an NF that the SEPP is able to parse. As shown in example 400, an HTTP request message has a request line 402, headers 404, and message body (with JSON content) 406. The request line 402 further comprises an HTTP uniform resource indicator (URI) which comprises a destination address 412 (e.g., the NF to which the message is being sent) which can be a destination domain name or an IP address, name of the API 414, a UE identifier (id) 416, and a resource identifier 418. The UE id field 416, when present, identifies the UE for which the message sent requests a particular resource type. For example, UE id could be SUPI, Globally Unique Temporary Identifier (GUTI), etc. Resource identifier 418 is a field that identifies the resource name for which the particular HTTP operation is requested. The API (414) and the impacted resource represents the service provided by the network function (e.g., AMF, UDM, AUSF, etc.).

Figure 5:
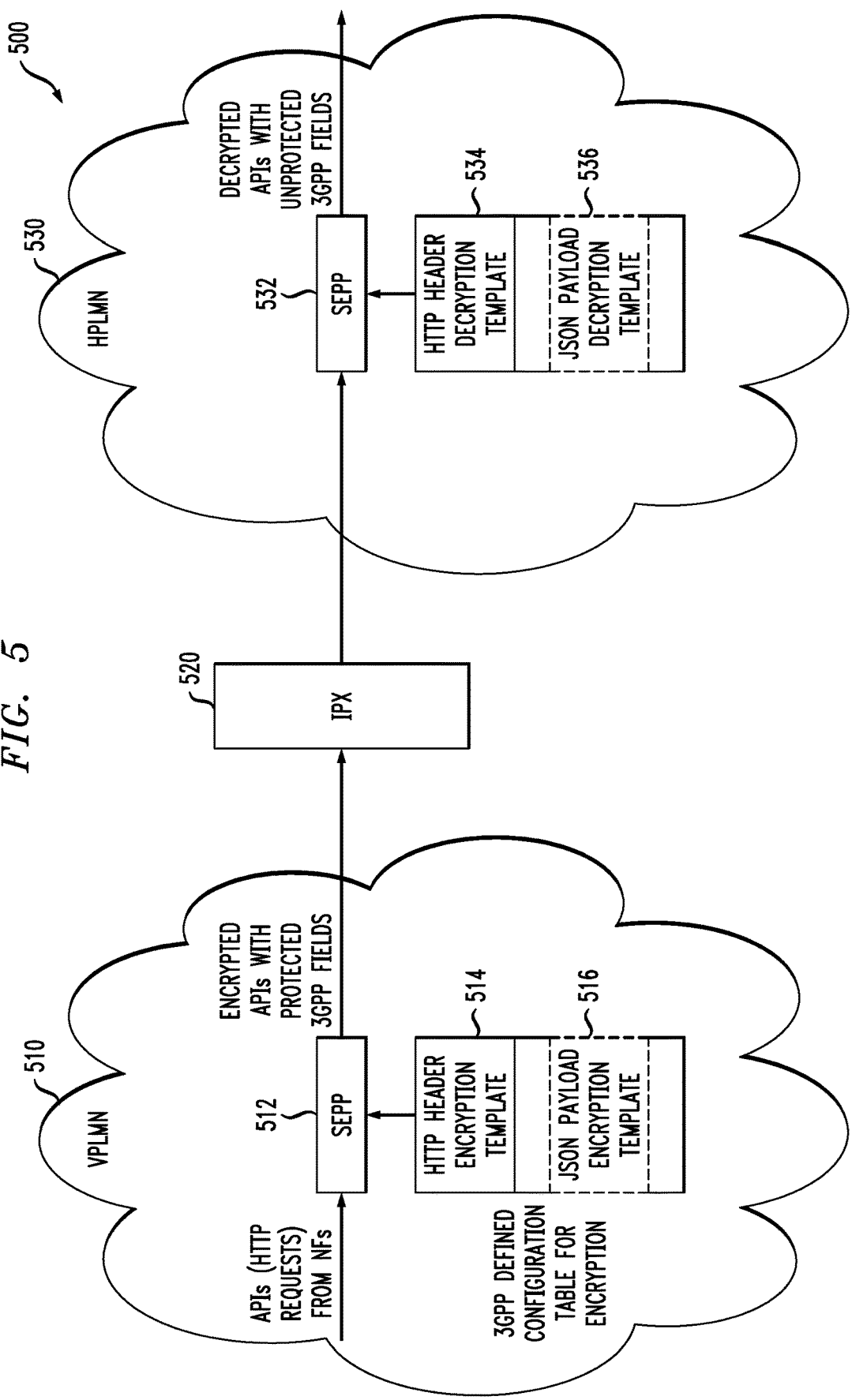
FIG. 5 illustrates a security management process of a security edge protection proxy applying one or more appropriate security operations based on provisioned information, according to an illustrative embodiment.

Turning now to FIG. 5, a security management process 500 is depicted in a communication system with a VPLMN 510 operatively coupled via an IPX network 520 to a HPLMN 530. As shown, SEPP 512 in VPLMN 510 receives an HTTP Request message (with the format shown in FIG. 4) from a given NF (e.g., AMF in FIG. 3) in the VPLMN 510. SEPP 512 uses a 3GPP defined configuration table that comprises an HTTP header encryption template 514, which contains information on which HTTP header fields to integrity protect and encrypt and a JSON payload encryption template 516, which contains information on which IEs to integrity protect and encrypt, to perform the following steps. SEPP 512 parses the HTTP Request-URI and headers and executes the required protection mechanism. SEPP 512 parses the HTTP message payload beginning from the first IE. For each IE in the message, SEPP 512 refers to the provisioned configuration table (514 and 516) looking for a match with the incoming message and executes the required protection mechanism using the standardized JOSE framework. The transformed IE replaces the original IE. For example, as shown in FIG. 5, the secured message sent by SEPP 512 over the N32 interface comprises encrypted APIs with protected 3GPP fields.

The secured message is received by SEPP 532 in HPLMN 530. SEPP 532 parses the HTTP Request-URI and headers and restores the original content. SEPP 532 parses the HTTP message payload beginning from the first IE. For each IE in the message, SEPP transforms the secured message into the original message from the information contained in the JOSE object with reference to 3GPP defined configuration table that comprises an HTTP header decryption template 534 and a JSON payload decryption template 536. That is, similar to SEPP 512, SEPP 532 looks for a match between the template information and the message and applies the appropriate operation. For example, as shown in FIG. 5, the message output by SEPP 534 and forwarded to the destination NF in HPLMN 530 comprises decrypted APIs with unprotected 3GPP fields.

Advantageously, as shown in FIG. 5, the 3GPP specific API header fields and payload fields to be protected at the sending SEPP (and then unprotected at the receiving SEPP) are known to each SEPP from the provisioned templates with which each SEPP is configured by its MNO. In illustrative embodiments, each SEPP is configured with encryption and decryption templates in order to handle traffic in both directions. Thus, in one or more illustrative embodiments, encryption and integrity protection may be considered a security operation and decryption and verifying integrity protection may be considered a reverse security operation.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
in a communication system comprising a first network operatively coupled to a second network, wherein the first network comprises a first security edge protection proxy element operatively coupled to a second security edge protection proxy element of the second network;
provisioning the first security edge protection proxy element with configuration information that enables the first given security edge protection proxy element to identify at least one security operation to be applied to at least one information element in a received message before sending the message to the second security edge protection proxy element;
wherein the configuration information comprises:
a first type of security operation to be applied by the first security edge protection proxy element to information elements of a first type; and
at least a second type of security operation to be applied by the first security edge protection proxy element to information elements of a second type, the second type of security operation being different than the first type of security operation.

2. The method of claim 1, further comprising the first security edge protection proxy element applying the at least one security operation to the at least one information element in the received message to form a secured message.

3. The method of claim 2, wherein the first security edge protection proxy element parses the received message to obtain the at least one information element.

4. The method of claim 2, further comprising the first security edge protection proxy element sending the secured message to the second security edge protection proxy element.

5. The method of claim 1, wherein the configuration information with which the first security edge protection proxy element is provisioned comprises at least one of a header template and a payload template that enable the first security edge protection proxy element to identify at least one of a header and a payload in the received message such that an appropriate security operation is applied.

6. The method of claim 1, further comprising provisioning 4 the first security edge protection proxy element with configuration information that enables the first security edge protection proxy element to identify at least one reverse security operation to be applied to at least one information element in a secured message received from the second security edge protection proxy element.

7. The method of claim 1, wherein the received message is a HyperText Transport Protocol (HTTP) request message.

8. The method of claim 7, wherein a format of the HTTP request message utilizes a JavaScript Object Notation (JSON).

9. An article of manufacture comprising a non-transitory computer-readable storage medium having embodied therein executable program code that when executed by a processor causes the processor to perform the step of:

in a communication system comprising a first network operatively coupled to a second network, wherein the first network comprises a first security edge protection proxy element operatively coupled to a second security edge protection proxy element of the second network;

provisioning the first security edge protection proxy element with configuration information that enables the first security edge protection proxy element to identify at least one security operation to be applied to at least one information element in a received message before sending the message to the second security edge protection proxy elements;

wherein the configuration information comprises:

a first type of security operation to be applied by the first security edge protection proxy element to information elements of a first type; and at least a second type of security operation to be applied by the first security edge protection proxy element to information elements of a second type, the second type of security operation being different than the first type of security operation.

10. The article of claim 9, further comprising the first security edge protection proxy element applying the at least one security operation to the at least one information element in the received message to form a secured message.

11. The article of claim 9, wherein the configuration information with which the first security edge protection proxy element is provisioned comprises at least one of a header template and a payload template that enable the first security edge protection proxy element to identify at least one of a header and a payload in the received message such that an appropriate security operation is applied.

12. The article of claim 9, further comprising provisioning the first security edge protection proxy element with configuration information that enables the first security edge protection proxy element to identify at least one reverse security operation to be applied to at least one information element in a secured message received from the second security edge protection proxy element.

13. Apparatus comprising:

in a communication system comprising a first network operatively coupled to a second network, wherein the first network comprises a first security edge protection proxy element operatively coupled to a second security edge protection proxy element of the second network;

at least one processor coupled to a memory and configured to:

provision the first security edge protection proxy element with configuration information that enables the first security edge protection proxy element to identify at least one security operation to be applied to at least one information element in a received message before sending the message to the second security edge protection proxy element;

wherein the configuration information comprises:

a first type of security operation to be applied by the first security edge protection proxy element to information elements of a first type; and at least a second type of security operation to be applied by the first security edge protection proxy element to information elements of a second type, the second type of security operation being different than the first type of security operation.

14. The apparatus of claim 13, wherein the processor and memory are further configured to enable the first security edge protection proxy element to apply the at least one security operation to the at least one information element in the received message to form a secured message.

15. The apparatus of claim 14, wherein the first security edge protection proxy element parses the received message to obtain the at least one information element.

16. The apparatus of claim 14, further comprising the first security edge protection proxy element sending the secured message to the second security edge protection proxy element.

17. The apparatus of claim 13, wherein the configuration information with which the first security edge protection proxy element is provisioned comprises at least one of a header template and a payload template that enable the first security edge protection proxy element to identify at least one of a header and a payload in the received message such that an appropriate security operation is applied.

18. The apparatus of claim 13, wherein the processor and the memory are further configured to provision the first security edge protection proxy element with configuration information that enables the first security edge protection proxy element to identify at least one reverse security operation to be applied to at least one information element in a secured message received from the second security edge protection proxy element.

19. The apparatus of claim 13, wherein the received message is a HyperText Transport Protocol (HTTP) request message.

20. The apparatus of claim 19, wherein a format of the HTTP request message utilizes a JavaScript Object Notation (JSON).

21. The method of claim 1, wherein the first type of security operation comprises end-to-end encryption, and the second type of security operation comprise end-to-end integrity protection.

22. The method of claim 21, wherein the end-to-end integrity protection allows a provider of the second network to manipulate information elements to which the end-to-end integrity protection is applied.

* * * * *